March 6, 1934.    J. TUTEUR    1,950,201
SPRAYING ATTACHMENT FOR VACUUM CLEANERS
Filed March 17, 1932    2 Sheets-Sheet 1
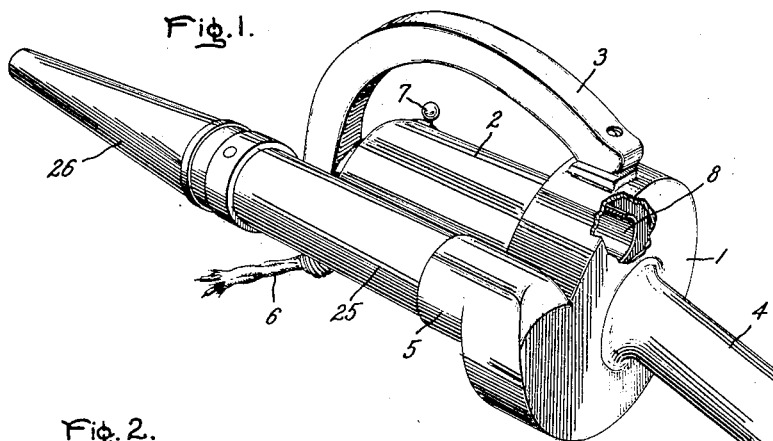
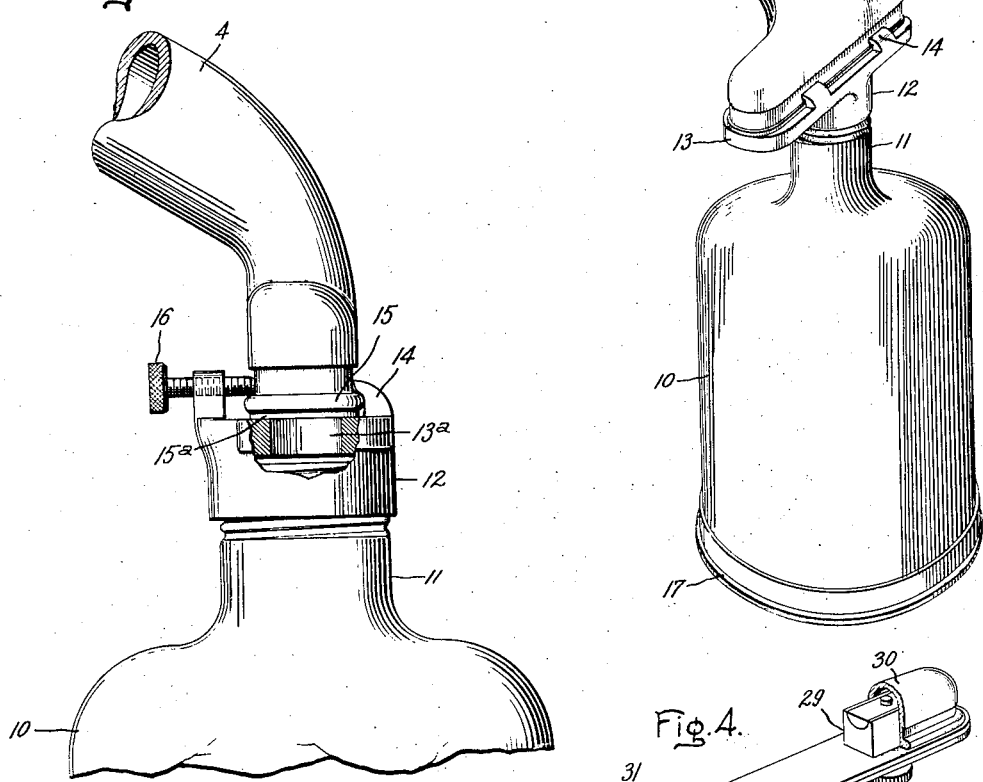
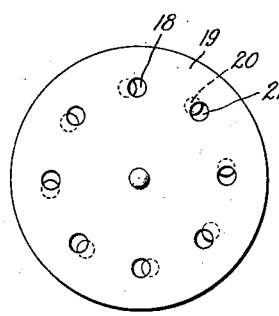
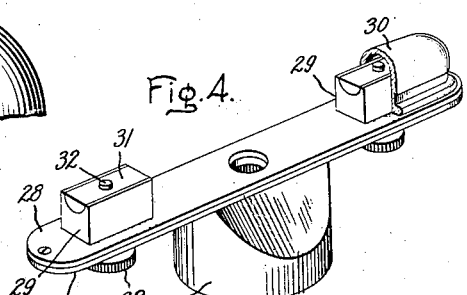
Inventor:
Julius Tuteur,
by Charles Mueller
His Attorney.

March 6, 1934.  J. TUTEUR  1,950,201
SPRAYING ATTACHMENT FOR VACUUM CLEANERS
Filed March 17, 1932   2 Sheets-Sheet 2
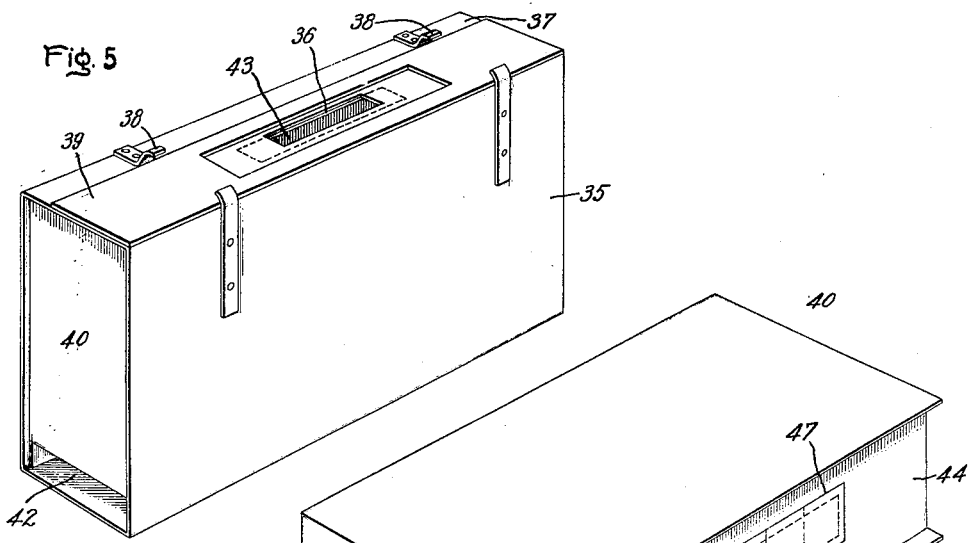
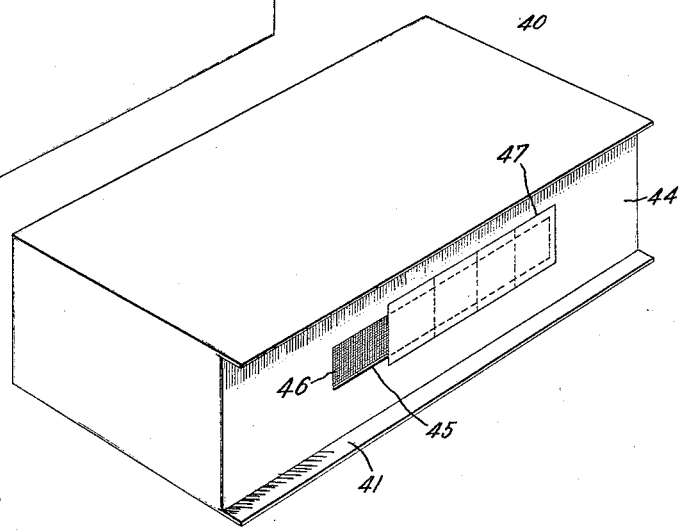
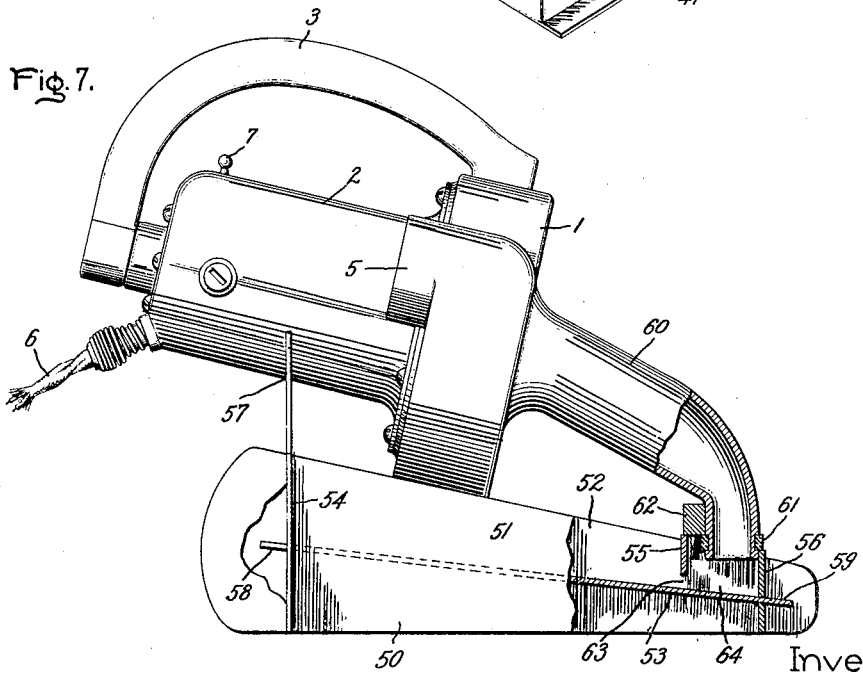
Inventor:
Julius Tuteur
by Charles T. Tuteur
His Attorney.

Patented Mar. 6, 1934

1,950,201

UNITED STATES PATENT OFFICE 1,950,201

SPRAYING ATTACHMENT FOR VACUUM CLEANERS

Julius Tuteur, Cleveland, Ohio, assignor to Electric Vacuum Cleaner Company, Inc., Cleveland, Ohio, a corporation of New York Application March 17, 1932, Serial No. 599,408

4 Claims. (Cl. 43—124)

This application is a continuation in part of my application Serial No. 544,417, filed June 15, 1931.

The inventon relates to spraying devices for use with a vacuum cleaner for spraying chemicals for the extermination of moths or other insects or for fumigating, and has for its object generally to provide an improved mechanism for this purpose.

A further object of the inventon is to provide spraying means which utilizes devices adapted to be attached to or utilized in connection with vacuum cleaners of the so termed hand type, that is, cleaners which are carried in the hand when being used, as distinguished from cleaners which are pushed about the floor by a long handle.

For a consideration of what I believe to be novel and my invention, attention is directed to the accompanying description and the claims appended thereto.

In the drawings, Fig. 1 is a perspectve view, with parts broken away, of a hand vacuum cleaner to which is attached a spraying device embodying my invention; Fig. 2 is a side view of the cleaner nozzle shown in Fig. 1, the lower portion of the container being broken away; Fig. 3 is a bottom plan view on a smaller scale of the container shown in Fig. 1; Fig. 4 shows a modified arrangement for attaching a receptacle to the nozzle of a vacuum cleaner; Figs. 5 and 6 are perspectve views of another modification, and Fig. 7 is a side elevation, partly in section, of a further modification.

According to my invention, I provide a feeding means for the chemical which is attached to the inlet of the impeller of the vacuum cleaner, ordinarily to the suction nozzle, so that the chemical passes through the impeller along with the air. By this arrangement, the chemical is thoroughly mixed with and distributed through the air, the impeller in the case of a more or less coarse or crystalline substance serving to pulverize it due to the beating action of the impeller blades. By attaching the feeding means to the inlet of the impeller, the rate at which the chemical is fed can be adjusted to the desired value by varying the rate of feed of air to the suction inlet. This can be accomplished by adjusting suitable openings to the container in which the chemical is held or by adjusting a by-pass in the nozzle of the cleaner. On the discharge side of the impeller, I provide a suitable tube through which the mixture of air and chemical is discharged, this being the discharge opening to which the vacuum cleaner bag is normally connected.

I regard the feeding of the chemical along with the air through the impeller, the air serving to carry the chemical to the impeller and the impeller serving as a mixing agent, as being an important feature of my invention.

Referring to the drawings, Figs. 1 to 3, 1 indicates the impeller casing of a hand vacuum cleaner, 2 indicates the motor, 3 indicates the handle, 4 indicates the nozzle, and 5 indicates the discharge outlet. The conductors leading to the motor are indicated at 6 and the electric switch controlling the motor is indicated at 7. In impeller casing 1 is the impeller 8.

The construction so far described is that of a known type of hand vacuum cleaner, and is to be taken as typical of any vacuum cleaner having a motor driven impeller, a suction inlet and a discharge outlet.

According to the modification of the invention shown in Figs. 1 to 3, I provide a container 10 having a threaded neck 11 adapted to screw into a threaded neck 12 carried by an attachment plate 13 adapted to be fastened to the nozzle of the vacuum cleaner. Attachment plate 13 serves to seal the nozzle of the vacuum cleaner except for its connection with the container 10, the plate being provided with an opening 13$^a$ in line with neck 12. The attachment plate may be fastened to the cleaner nozzle in any suitable manner. In the present instance it is shown as being attached thereto by means of hooks 14 on one side which engage bead 15 on the nozzle and a screw 16 on the other side which engages the nozzle about bead 15. The upper surface of attachment plate 13 may be provided with a suitable packing or gasket 15$^a$, such as a rubber packing or gasket, for making tight sealing engagement with the nozzle. This forms a simple means for attaching plate 13 to nozzle and one which is readily applied and removed.

Container 10 may be made of any suitable material such as glass, for example, and may be the original container in which the chemical is purchased or it may be a separate container in which the chemical is placed by the user. The lower end of container 10 is closed by a removable cover 17 and comprises inner and outer walls 18 and 19 provided with openings 20 and 21 which are adapted to be moved into and out of registry with each other, the wall 19 being adapted to be turned relatively to the wall 18. By this means the area of the openings to the container 10 may be adjusted readily.

Connected to the discharge opening 5 of the cleaner is an extension tube 25 on the end of which is a discharge nozzle 26. The extension tube 25 may be made of metal, while the discharge tube 26, if found desirable, may be made of some flexible material, such as rubber, so that it may be flexed to point in different directions if found desirable. As a chemical for use with the device, I have found paradichlorobenzene to be satisfactory. This chemical is purchased in crystalline form.

In use of the invention the container 10 with the chemical therein is attached to the nozzle 4, as shown in Fig. 1. The motor is then started, putting the impeller into operation after which the openings in the cover 17 of the container are adjusted to give the desired rate of feed of the chemical. The flow of air through the container into the nozzle carries the chemical along with it to the impeller 8. In passing through the impeller 8 the chemical becomes finally divided and thoroughly mixed with the air, a crystalline substance, such as paradichlorobenzene, being thoroughly pulverized. The mixture of air and chemical is discharged from the nozzle 26 to the desired point of use. The chemical may be fed either rapidly or slowly as found desirable by adjusting the air inlets in the cover.

In Fig. 4 is shown a modified arrangement for fastening the attachment plate to the cleaner nozzle. The attachment plate 27, which may be made of metal, is provided on its face with a sealing gasket 28, which may be made of a suitable material, such as rubber. Formed integral with the gasket are spaced projecting lugs 29 formed of a yieldable material, such as rubber, the lugs being adapted to fit inside the cleaner nozzle 30 in engagement with the side walls thereof. In connection with the lugs is provided a suitable means for expanding them against the walls of the nozzle after they have been inserted into the nozzle. In the present instance this expanding means comprises rounded metal bars 31 which form wedges adapted to be drawn down against the rubber projections to expand them. The bars are drawn by threaded members 32 which pass through openings in plate 27 and screw into the bars. In the use of the construction shown in Fig. 4, the lugs 29 are inserted into the vacuum cleaner nozzle, the sealing plate being brought tightly into engagement with the face of the nozzle, after which the threaded members 32 are turned to draw down bars 31 to expand the lugs against the sides of the nozzle walls, thus clamping the nozzle plate in position. The threaded neck 33 on the attachment plate may be similar to the neck 12 shown in Fig. 1, and is adapted to have attached to it a container in which the chemical is held.

In Figs. 5 and 6 is shown a modified construction of attaching means and container. The attaching means comprises a rectangular metal holder or frame 35 provided with an opening 36 in its top wall 37 and adapted to be attached to a nozzle with its top wall 37 in sealing engagement with the nozzle. In the present instance, holder or frame 35 is shown as being provided with hooks 38 adapted to be slipped over a bead on a vacuum cleaner nozzle, such as the bead 15. A sealing gasket 39 of rubber or other suitable material, may be provided on wall 37 for effecting a tight seal with the nozzle. 40 is a container for the chemical. It may be the original container in which the chemical is purchased. It may be made of any suitable material such as for example, paste-board or the like, the material depending upon the chemical which it is to contain. It is of a size adapted to slide inside the rectangular holder 35 as shown in Fig. 5, and is provided with projecting side walls 41 so that when slid inside of holder 35 it is spaced somewhat from the bottom thereof, as indicated at 42 in Fig. 5, thus providing a passage for air. The top wall of container 40 is pressed firmly against the top wall of the holder 35. Container 40 is provided with a readily removable section in its upper wall so that an opening 43 may be made in it to stand in line with opening 36. In its lower wall 44 the container is provided with a rectangular opening 45 covered with suitable porous material 46 over which is pasted a sectional covering 47. By removing sections of the cover 47 the desired opening may be provided in the lower wall of container 40.

In the use of the construction shown in Figs. 5 and 6, the holder or frame 35 is attached to the vacuum cleaner nozzle by hooks 38 after which the container 40 with the opening 43 formed therein and the desired amount of opening 45 uncovered, is inserted in the holder or frame, as is shown in Fig. 5. The cleaner is then operated, air being drawn in through opening 45 and passing through the container to opening 43, and thence through the vacuum cleaner nozzle to the impeller. The air carries with it a certain amount of the chemical which is mixed with the air by the impeller. The mixture is discharged through the discharge opening of the cleaner.

In Fig. 7 I have shown a modification of my invention wherein the container is in the form of a supporting tray which supports the cleaner and feeds the chemical to the suction nozzle. 50 indicates the support. It comprises a pair of side members or walls 51 and 52 which may be made of thin sheet metal or of some sound deadening material such as hard fiber, for example, and which are adapted to rest on the floor of a closet or other enclosure. The support is provided also with an inclined bottom member or wall 53, a back wall or member 54, and a pair of front cross members or walls 55 and 56 of the same material. The back member is cut away in the center of its upper end to form a curved saddle 57 to receive the curved underside of the motor casing of a vacuum cleaner, and thus form a support for it. The back member also has a pair of horizontal slots to receive tongues 58 on the rear end of bottom wall 53. The front wall is similarly provided with slots to receive the tongues 59 on the front end of the bottom wall. The side and end members each have vertical slots extending substantially half way of their length so that when the parts are assembled they interlock. These parts may make a forced fit so as to avoid the use of attaching screws or equivalent means.

The front cross members are united to the side members by a slotted arrangement similar to that already referred to. The members 55 and 56 rise to different levels so as to form a support for the nozzle 60 of a vacuum cleaner and hold the same in a downwardly inclined position. The front member or wall 56 is arranged to engage the bumper 61 extending across the front of the nozzle. The member 55 engages the brush carrying bar 62 which is firmly attached to the rear of the nozzle and extends entirely across it. The fact that the nozzle is relatively wide and is fully supported along its length results in the firm supporting of the front end of the cleaner. The weight of the cleaner is sufficient to hold it in place without special securing means, which makes for simplicity of construction and ease of application.

The hand cleaner illustrated in Fig. 7 is similar to that shown in Fig. 1.

The support, in addition to acting as a support for the cleaner, serves as a container or box for the chemical which is confined by its bottom, side and end walls. It is to be noted that the bottom wall instead of being horizontal is inclined downwardly toward the nozzle and at such an angle that slight vibrations will cause the chemical to move slowly by gravity toward the nozzle. The angle of incline will be governed by the kind of chemical used; a freely moving chemical will require less slant or incline than one which does not move so freely. Paradichlorobenzene, for example, which is of crystalline form, moves rather freely in response to vibration. To regulate the flow of chemical to the nozzle and also to prevent the suction of the nozzle from entraining too great an amount of chemical, cross wall 55 is utilized to form a gate beneath which the chemical is fed to the nozzle. This is accomplished by cutting away the lower edge of the wall 55 between the side walls to form a narrow horizontal slot 63 through which the chemical must pass before it can enter the suction nozzle.

A well designed suction cleaner has very little vibration occasioned by its rotating parts, but nevertheless, I have found it to be sufficient to vibrate the support to such a degree as will cause the chemical to move down a properly inclined bottom wall when the suction nozzle is acting to remove the particles of chemical as it passes through the gate into the small compartment 64 directly under the nozzle. With the motor running the suction fan elevates the chemical from the compartment 64 and as it passes through the vacuum cleaner impeller, it is mechanically divided into small particles and leaves the discharge conduit in the form of a fine spray or mist which in the course of a short time is deposited on the clothing in the closet or other receptacle.

In connection with each of the constructions shown it will be seen that the attachment or support in no way affects the use of the cleaner for its normal functions of collecting dust and litter, and its application as a sprayer of moth killing chemical or the like necessitates merely removing the dust bag, assembling the fixtures in connection with the cleaner, and then utilizing it to direct the chemical to the desired point or points.

What I claim as new and desire to secure by Letters Patent of the United States is:

1. A spraying device for use with a vacuum cleaner having a nozzle, a suction fan and a rotary driving motor, said device forming a support for holding the cleaner in a fixed downwardly-inclined position, a receptacle formed in the support for the spraying material having a downwardly-inclined bottom wall extending toward the nozzle whereby the vibration of the cleaner causes the material to progressively move toward the nozzle.

2. A spraying device for use with a vacuum cleaner having a nozzle, a suction fan and a rotary driving motor, said device forming a fixed support for the cleaner and having a receptacle for spraying material, the bottom wall of the receptacle being downwardly inclined toward the nozzle, and a means for regulating the flow of material toward the nozzle from the receptacle as the cleaner vibrates, said means also acting as a wall to prevent the suction of the nozzle from affecting the main supply of material within the receptacle.

3. A spraying device for use with a vacuum cleaner having a nozzle, a suction fan and a rotary driving motor, said device forming a fixed support for the cleaner and having side, end and bottom walls defining a receptacle, the side and end walls also acting as supporting members, said bottom wall being downwardly inclined toward the nozzle, a transverse partition situated adjacent the nozzle and spaced slightly above the bottom wall to define a gate through which the material passes to the nozzle under the vibratory action of the cleaner.

4. A spraying device comprising a support having interlocked side and end walls adapted to rest on a fixed surface, and a downwardly-inclined bottom wall supported by the two end walls, said walls defining a receptacle for spraying material, said end walls being of different heights whereby they are adapted to support a vacuum cleaner in a downwardly inclined position, and means controlling the flow of spraying material down the inclined bottom wall.

JULIUS TUTEUR.